(12) United States Patent
Abney et al.

(10) Patent No.: US 10,000,413 B1
(45) Date of Patent: Jun. 19, 2018

(54) CARBON-ENHANCED CEMENT CLINKER

(71) Applicant: The United States of America as Represented by the Administrator of the National Aeronautics and Space Administration, Washington, DC (US)

(72) Inventors: Morgan Barrera Abney, Athens, AL (US); James E. Alleman, Ames, IA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 274 days.

(21) Appl. No.: 14/971,757

(22) Filed: Dec. 16, 2015

(51) Int. Cl.
    *C04B 22/00* (2006.01)

(52) U.S. Cl.
    CPC .................. *C04B 22/00* (2013.01)

(58) Field of Classification Search
    CPC .................................................. C04B 22/00
    USPC .......................................................... 428/402
    See application file for complete search history.

(56) References Cited

U.S. PATENT DOCUMENTS

| | | | |
|---|---|---|---|
| 3,207,705 A | 9/1965 | Hall | |
| 4,396,422 A * | 8/1983 | Matsuno | C21B 3/04 |
| | | | 106/693 |
| 5,032,181 A | 7/1991 | Chung | |
| 6,685,771 B2 | 2/2004 | Long et al. | |
| 6,752,865 B2 * | 6/2004 | Nayak | C04B 7/22 |
| | | | 106/693 |
| 6,866,702 B2 | 3/2005 | Mitsuda | |
| 8,617,309 B1 | 12/2013 | Carney et al. | |
| 8,864,878 B2 | 10/2014 | Handagama et al. | |
| 2012/0034150 A1 | 2/2012 | Noyes | |
| 2014/0348739 A1 | 11/2014 | Denton et al. | |
| 2017/0204010 A1 * | 7/2017 | Atakan | C04B 28/06 |
| 2017/0283319 A1 * | 10/2017 | Maslehuddin | C04B 14/185 |

FOREIGN PATENT DOCUMENTS

| | | |
|---|---|---|
| CN | 103553447 A | 2/2014 |
| CN | 103553453 A | 2/2014 |
| EP | 2559472 A1 | 2/2013 |
| EP | 2481472 B1 | 8/2014 |
| WO | WO 2010120581 A1 | 10/2010 |

OTHER PUBLICATIONS

Morgan B. Abney and J. Matthew Mansell, The Bosch Process—Performance of a Developmental Reactor and Experimental Evaluation of Alternative Catalysts, American Institute of Aeronautics and Astronautics, 40th International Conference on Environmental Systems, Jul. 11, 2010, AIAA.2010-6272, Barcelona, Spain.

* cited by examiner

*Primary Examiner* — Leszek Kiliman
(74) *Attorney, Agent, or Firm* — James J. McGroary; Mark P. Dvorscak

(57) ABSTRACT

A clinker for use in cement manufacturing includes a cement clinker mixture having crystals of an element that is less electronegative than carbon and carbon bonded to at least a portion of the crystals.

15 Claims, 2 Drawing Sheets

CARBON-ENHANCED CEMENT CLINKER

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

1. Field of the Invention

This invention relates to cement clinkers. More specifically, the invention is a clinker product that has been enhanced with carbon to improve the properties of concrete manufactured using cement that includes the clinker product.

2. Description of the Related Art

Over time, the leaching of ions (e.g., chlorine ions) into concrete structures corrodes and weakens metal supports that are typically found in concrete structures. Corrosion of the metal support shortens the useful life of the structure. Since chlorine ions are prevalent in a variety of sources, most concrete structures are subject to chlorine-leaching-based damage.

SUMMARY OF THE INVENTION

Accordingly, it is an object of the present invention to increase the useful life of metal-reinforced concrete structures by reducing ion leaching into concrete.

Other objects and advantages of the present invention will become more obvious hereinafter in the specification and drawings.

In accordance with the present invention, a clinker for use in cement manufacturing includes a cement clinker mixture. The cement clinker mixture includes crystals of an element that is less electronegative than carbon (e.g., iron, cobalt, nickel, etc.) and carbon bonded to at least a portion of the crystals.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
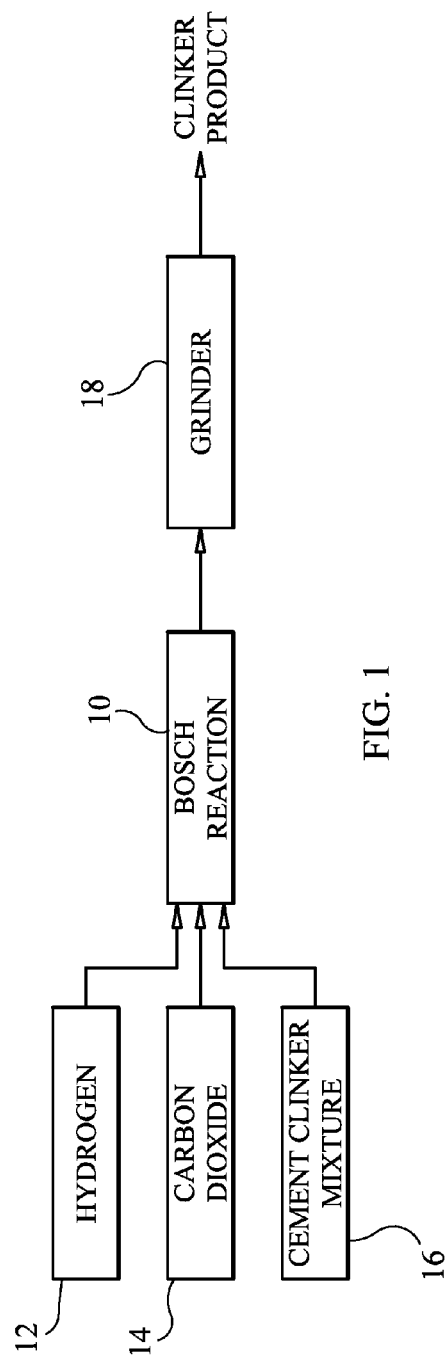
FIG. 1 is a flow diagram illustrating the process for producing a clinker product in accordance with the present invention.

Referring now to the drawings and more particularly to FIG. 1, a flow diagram is illustrated of a process used to produce a novel clinker product in accordance with the present invention. The clinker product can then be used in cement manufacturing. As will be explained further below, concrete that includes cement manufactured to include the novel clinker product described herein exhibits a slower rate of ion leaching as compared to conventional concrete.

In accordance with the present invention, a Bosch reaction 10 is supplied with hydrogen 12 and carbon dioxide 14. As is known in the art, Bosch reactions generate a chemical reaction between hydrogen and carbon dioxide that produces carbon, water, and heat. For a description of Bosch reactions, see (for example) Abney et al., "The Bosch Process—Performance of Developmental Reactor and Experimental Evaluation of Alternative Catalysts," 40$^{th}$ International Conference of Environmental Systems, AIAA 2010-6272, 2010. In the present invention, Bosch reaction 10 is also supplied with a cement clinker mixture 16 that could be ground, supplied directly from the furnace of a cement plant, etc., without departing from the scope of the present invention. In general, cement clinker mixture 16 is any of a variety of clinker formulations that can be used in the manufacturing of cement. For purpose of the present invention, cement clinker mixture 16 must include crystals of an element that is less electronegative than carbon. For example, such elements include iron, nickel, and cobalt, with iron being generally found in most cement clinkers.

Cement clinker mixture 16 is provided to Bosch reaction 10 in a ground form. While the particle sizes of cement clinker mixture 16 are not a limitation of the present invention, more of the electronegative crystal elements are exposed for mixtures 16 comprised of smaller particles. Accordingly, mixture 16 can be ground into small particles thereof (e.g., on the order of approximately one millimeter) for applications seeking to maximize exposure of the electronegative crystal elements.

As mentioned above, Bosch reaction 10 produces carbon, water, and heat when supplied with hydrogen and carbon dioxide. The reaction within Bosch reactor 10 can be accelerated in the presence of an iron, nickel, or cobalt catalyst. Thus, the presence of one or more of iron, nickel, or cobalt crystals in clinker mixture 16 serves to accelerate the known Bosch reaction. In addition, it has been found that the carbon generated during the Bosch reaction bonds to at least a portion of the electronegative element crystals. The carbon generated during the Bosch reaction process can take the form of elemental carbon as well as allotropes of carbon (e.g., graphite, graphene, amorphous carbon, carbon fibers, carbon nanotubes, etc.). Accordingly, the word "bond" as used herein as it relates to the relationship between the generated carbon and the electronegative element crystals includes covalent bonding, ionic bonding, encasement or capture of the crystals by carbon allotropes, etc. The dispersion of carbon in the clinker matrix can be controlled by the particle size of clinker mixture 16. Ion leaching is reduced in concrete made from cement that includes the clinker product of the present invention. In general, ion leaching decreases with increased amounts of carbon as the carbon "blocks" (e.g., attracts, bonds, and/or traps) the ions as they migrate through the concrete.

It has further been found that the carbon produced in Bosch reaction 10 can also bond to the carbon that bonds to the electronegative element crystals. These carbon-to-carbon bonds can occur via a variety of mechanisms depending on the types of carbon as would be understood in the art. This additional carbon can add to the weight percent in the present invention's clinker product ultimately output from Bosch reaction 10. The additional carbon further improves ion blocking in a concrete material/structure made from cement that includes the carbon-enhanced clinker product.

Depending on how the clinker product (output from Bosch reaction 10) is to be used, it may be necessary to grind the clinker product. In such cases, a grinder 18 can be provided. Grinder 18 can also be supplied with additives (e.g., gypsum or other ingredients used in cement manufacturing).

Figure 2:
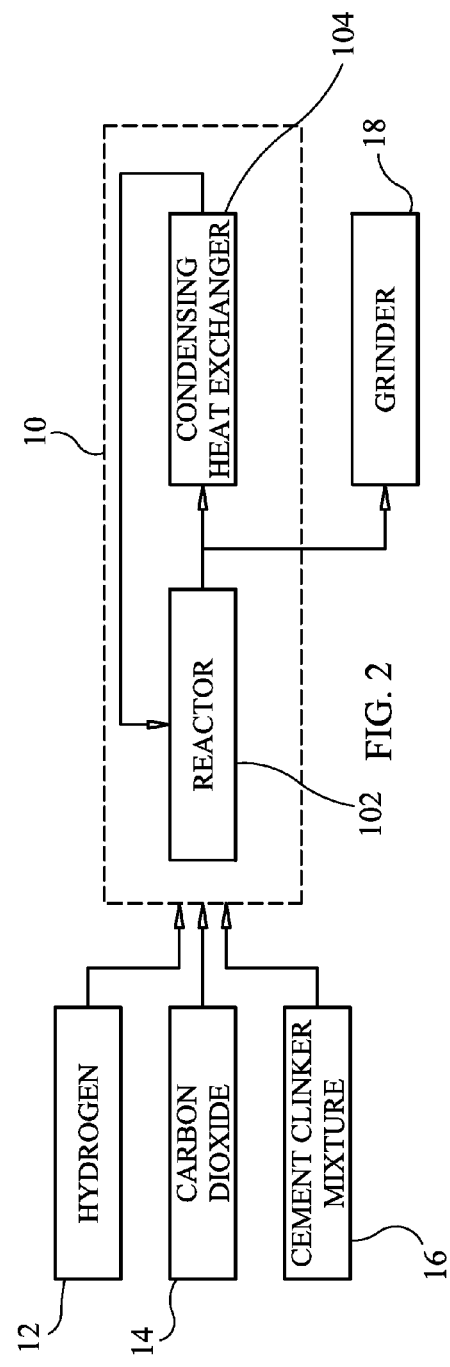
FIG. 2 is a simplified process flow diagram of a single-reactor Bosch system that can be used in the production of the clinker product.
Figure 3:
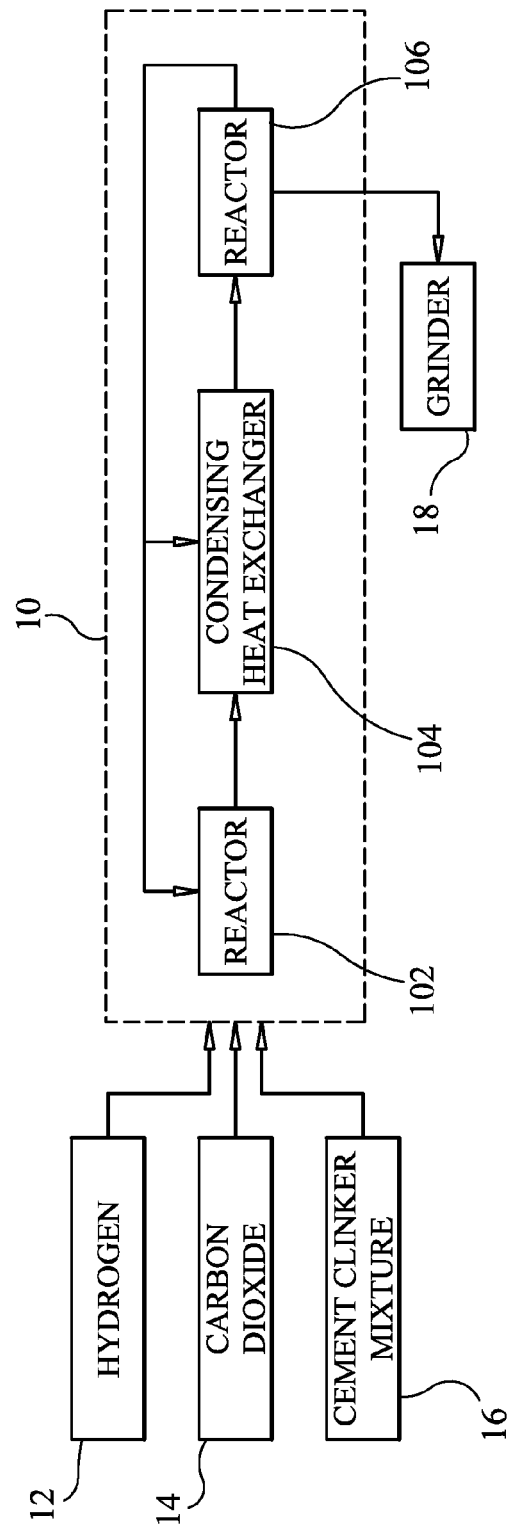
FIG. 3 is a simplified process flow diagram of a dual-reactor Bosch system that can be used in the production of the clinker product.

Bosch reaction 10 can be realized by a variety reactor systems. By way of non-limiting examples, a single reactor system and a dual reactor system will be described briefly herein. More specifically, FIG. 2 illustrates a single reactor system where a single reactor 102 generates gas products sent through a condensing heat exchanger 104 to remove bulk water prior to being recycled back to reactor 102. FIG. 3 illustrates a dual reactor system having a first reactor 102, a condensing heat exchanger 104, and a second reactor 106. In the dual reactor system, the gas products generated at reactor 102 are processed by heat exchanger 104 and reactor 106 before being recycled back to reactor 102 and/or heat exchanger 104.

The above-described process can be a stand-alone process that produces the clinker product, or can be readily incorporated into an existing cement manufacturing facility. In the latter case, the carbon dioxide could be extracted from the smoke-stack gases generated by a cement manufacturing facility. That is, the smoke-stack gases could be passed through a carbon dioxide extractor/concentrator to provide carbon dioxide 14 for Bosch reactor 10.

The advantages of the present invention are numerous. The clinker product generated by the above-described process has carbon bonded to the cement clinker mixture's electronegative element crystals. The amount of carbon in the carbon-enhanced clinker product can vary depending on the length of time that the clinker mixture is maintained in the Bosch reaction. As mentioned above, the amount of carbon in the carbon-enhanced clinker product directly impacts reduction in ion leaching into concrete materials/structures made from cement that includes the carbon-enhanced clinker product. In general, the ions' affinity for the carbon blocks ion migration through the concrete thereby preventing corrosive activity generally associated with the presence of ions. In addition, the presence of carbon in the concrete could provide electrical conductivity for ancillary applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A clinker product, comprising:
   a cement clinker mixture to include iron crystals; and
   carbon bonded to at least a portion of said iron crystals.

2. A clinker product as in claim 1, wherein said clinker mixture comprises particles thereof not to exceed approximately 1 millimeter in diameter.

3. A clinker product as in claim 1, further comprising additional carbon bonded to said carbon bonded to at least a portion of said iron crystals.

4. A clinker product as in claim 1, wherein said carbon is covalently bonded to said iron crystals.

5. A clinker product as in claim 1, wherein said carbon includes allotropes of carbon.

6. A clinker product as in claim 3, wherein said additional carbon includes allotropes of carbon.

7. A clinker product, comprising:
   a cement clinker mixture to include crystals of an element that is less electronegative than carbon; and
   carbon bonded to at least a portion of said crystals.

8. A clinker product as in claim 7, wherein said clinker mixture comprises particles thereof not to exceed approximately 1 millimeter in diameter.

9. A clinker product as in claim 7, further comprising additional carbon bonded to said carbon bonded to at least a portion of said crystals.

10. A clinker product as in claim 7, wherein said carbon is covalently bonded to said crystals.

11. A clinker product as in claim 7, wherein said carbon includes allotropes of carbon.

12. A clinker product as in claim 9, wherein said additional carbon includes allotropes of carbon.

13. A clinker product, comprising:
   a cement clinker mixture defined by particles thereof having a diameter not to exceed approximately 1 millimeter, said clinker mixture including iron crystals;
   carbon bonded to at least a portion of said iron crystals; and
   additional carbon bonded to said carbon bonded to at least a portion of said iron crystals.

14. A clinker product as in claim 13, wherein said carbon is covalently bonded to said iron crystals.

15. A clinker product as in claim 13, wherein said carbon and said additional carbon include allotropes of carbon.

\* \* \* \* \*